Aug. 17, 1954 A. A. MARKSON 2,686,635
ELECTROMAGNETIC RATIO COMPUTING DEVICE
Filed June 11, 1952 2 Sheets-Sheet 1
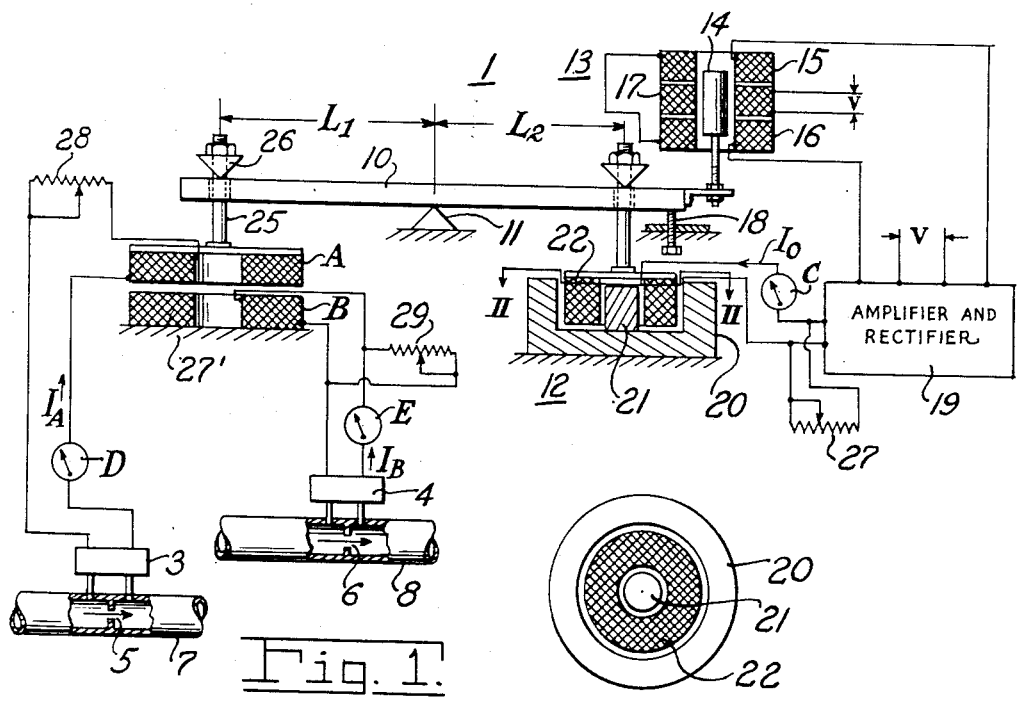
Fig. 1.
Fig. 2.
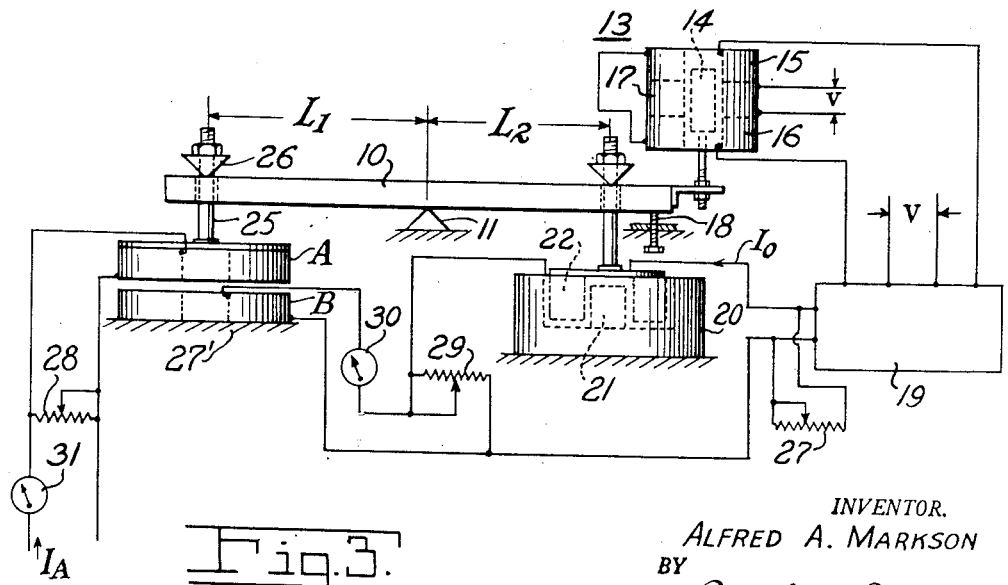
Fig. 3.
INVENTOR.
ALFRED A. MARKSON
BY
Zugelter & Zugelter
Attys.

Aug. 17, 1954   A. A. MARKSON   2,686,635
ELECTROMAGNETIC RATIO COMPUTING DEVICE
Filed June 11, 1952

INVENTOR.
ALFRED A. MARKSON
BY
Jugelter & Jugelter
Attys.

Patented Aug. 17, 1954

2,686,635

UNITED STATES PATENT OFFICE 2,686,635

ELECTROMAGNETIC RATIO COMPUTING DEVICE

Alfred A. Markson, Mount Lebanon Township, Allegheny County, Pa., assignor to Hagan Corporation, Pittsburgh, Pa., a corporation of Pennsylvania Application June 11, 1952, Serial No. 293,011

4 Claims. (Cl. 235—61)

This invention relates to devices that are provided with variable quantity input responsive means and an output means so arranged that the value of the output will be proportional to either the product, the quotient, the square, or the square root of the input quantities.

More specifically, the invention relates to an electrical device having several current input windings, an electric output device and means for balancing the output against the input, the device being so arranged and constructed that the value of the output can be made proportional to either the product, the quotient, the square, or the square root of the input.

An object of this invention is to provide an electrical device of such construction that an electric output will balance variable electric inputs, with the value of the output being proportional to either the product, the quotient, the square, or the square root of the electric inputs.

The above and other objects and advantages of the invention will be apparent to those skilled in this art from the following description taken in conjunction with the accompanying drawings in which:

Figure 1 is a more or less diagrammatic view of a device arranged and constructed in accordance with an embodiment of the invention, the device being shown connected for operation in a practical application thereof;

Fig. 2 is a top plan view of a component part of the device; and

Figs. 3, 4 and 5 are views showing modified connections of the coils embodied in the device of Fig. 1.

Figure 4:
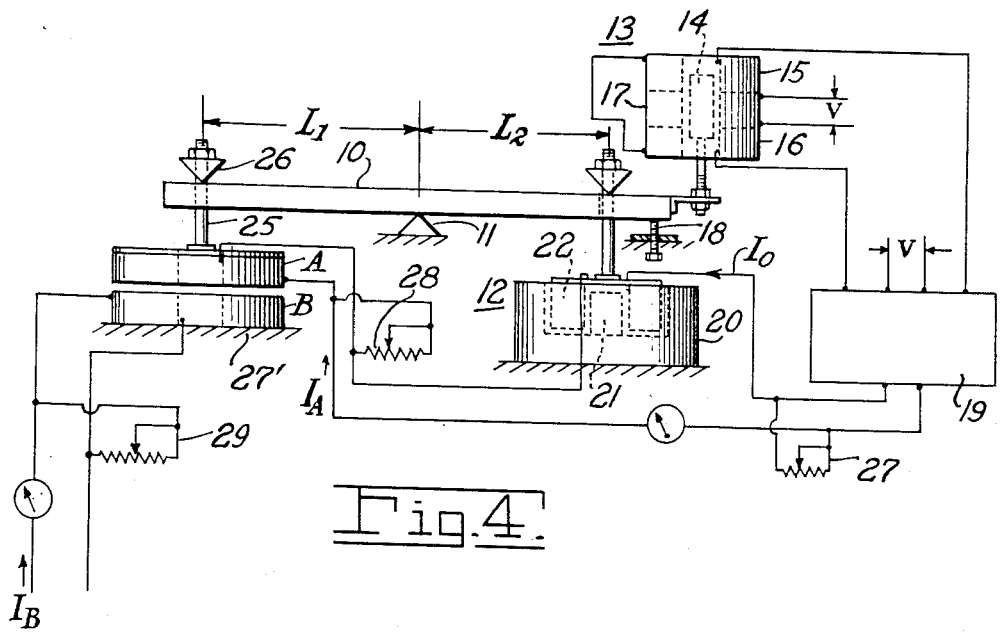

In the drawings a device 1 embodying a form of the invention is arranged and constructed to receive a plurality of separate variable current inputs $I_A$ and $I_B$ and to develop a current output $I_O$. The device is so arranged that the output $I_O$ may be caused to be proportional to the product, the quotient, the square or square root of the input current or currents, as will appear infra.

The current inputs $I_A$ and $I_B$ may be developed by devices 3 and 4 that are responsive to the pressure differentials developed across orifices 5 and 6 in pipes or conduits 7 and 8, respectively, through which a variable quantity, such as fluids or gases flow, for example.

Device 1 comprises a beam 10, mounted on a fulcrum 11, a plurality of input coils A and B and an output current responsive and balancing device 12. The device also includes a differential transformer 13 having a movable core 14 therein which is operatively connected to beam 10. The differential transformer 13 comprises coils 15 and 16 and an intermediate coil 17. Coils 15 and 16 are connected in series in opposed relation to each other, that is, they are so connected that the direction of the field of one coil is opposite in direction to the field in the other coil. The intermediate coil 17 is disposed to be connected to a source of input voltage. The beam 10 is provided with a stop 18 whereby under zero input conditions core 14 is in neutral position and the output voltage thereof will be zero. If the beam turns counter-clockwise on its fulcrum 11, the output voltage will increase from zero value towards its maximum output value but because of the stop 18, the core 14 can not pass through zero. The output voltage of the differential transformer is alternating. This output is delivered to a device 19 in which it is amplified and rectified, and the rectified output is delivered to device 12.

Device 12 comprises a permanent magnet of the pot type. The magnet as illustrated, comprises a cup 20 which is open at the top and having a center core 21. Device 12 includes a coil 22 which is circular or pancake in form so that it may be received in the annular space between the walls of the cup 20 and the central core 21. The magnetic core 20, 21, coil 22 and device 19 may be constructed in accordance with the arrangement shown in Fig. 1 of my co-pending application, Serial No. 184,569, filed September 13, 1950. Since the core is a permanent magnet it follows that the force exerted by coil 22 on the beam 10 and tending to turn it clockwise about fulcrum 11 will be directly proportional to the current input to coil 22. The current input to coil 22 is designated $I_O$ being the output current of transformer 13 as amplified and rectified.

Coils A and B may be of the pancake type. Coil A, as shown, is suspended by a rod 25 and knife edge 26 from beam 10, while coil B is stationarily mounted on the framework of the device as indicated at 27'. The operating air gap between coils A and B should be as small as possible.

In the arrangement of Fig. 1, the input currents to coils A and B are separate currents and have independent values. If the current input to coil A is designated $I_A$, and the current delivered to coil B is designated $I_B$, then it follows that the output current $I_O$ in coil 22 of balancing device 12 may be expressed by the equation:

$$I_O = K(I_A \cdot I_B)$$

where K is a constant the value of which is primarily determined by the ratio of the lever arms $L_1$ and $L_2$, see Fig. 1.

In order that the performance of the device 1 may be adjusted so that the product of currents $I_A$ and $I_B$ will result in an output current $I_O$ that is linearly proportional to the product throughout the entire range of the device, shunt resistors 27, 28 and 29 may be connected across the terminals of the respective coils 22, A and B.

Thus, from the above description of Figure 1, it has been shown that the output current $I_O$ is proportional to the product of the currents $I_A$ and $I_B$. The instantaneous values of the respective currents $I_O$, $I_A$ and $I_B$ may be indicated by ammeters C, D and E.

In Figs. 3 and 4 are illustrated modified connections of the coils of the device whereby the value of current in coil A and in coil B may be caused to be proportional to the quotient of the output current $I_O$ and the current in either coil A or coil B.

As shown in Fig. 3, coil 22 is connected in series with coil B. Coil A is supplied with an input current $I_A$. With the coils connected as in Fig. 3, beam 10 will be in balance when the force developed by coil 22 is equal to the force developed by coils A and B on the beam. The force produced by coil 22 is proportional to the current $I_O$ and may be expressed by the equation:

$$F_{22} = K I_O$$

The force produced by coils A and B may be expressed by the equation:

$$F_{AB} = K'(I_A \cdot I_O) \therefore$$

at balance, $$F_{22} = F_{AB}$$

$$\therefore I_A = K_x \left(\frac{I_O}{I_B}\right)$$

The value $$I_A = K_x \left(\frac{I_O}{I_B}\right)$$

may be derived as follows:

When $F_{22} = F_{AB}$ the sum of the moments of these forces about the fulcrum 11 is zero as shown by the following:

$$F_{22} L_2 - F_{AB} L_1 = 0$$

$$\therefore F_{22} L_2 = F_{AB} L_1$$

and $$F_{22} = \frac{L_1}{L_2} F_{AB}$$

$$\therefore F_{22} = K F_{AB}$$

where $$\frac{L_1}{L_2} = K$$

$$F_{22} = I_O$$

and $$F_{AB} = I_A \cdot I_B$$
$$\therefore I_O = K I_A \cdot I_B$$

and $$I_A = \frac{1}{K} \frac{I_O}{I_B} = K_x \left(\frac{I_O}{I_B}\right)$$

where $$K_x = \frac{1}{K}$$

when $I_B = I_O$ then $I_A = K_x$.

If an ammeter 30 is placed in the circuit of coils 22 and B, it follows that the value of current indicated by that ammeter will be proportional to the products of the currents in coils A and B. If an ammeter 31 is placed in circuit with coil A, it follows that the value of current indicated by that ammeter will be proportional to the quotient of the output current $I_O$ and the input current $I_B$ to coil B.

In Fig. 4 the hookup illustrated differs from the hookup of Fig. 3 in that in Fig. 4 coil A is connected in series with coil 22 and coil B receives an independent current input $I_B$. The value of current $I_B$ is proportional to the quotient of current $I_O$ and the current $I_A$; that is, $$I_B = K \left(\frac{I_O}{I_A}\right)$$

where K is a constant. The equation $$I_B = K \left(\frac{I_O}{I_A}\right)$$

may be derived by following the same procedure as given supra for deriving the equations $I_A = K_x$, or $$I_A = K_x \left(\frac{I_O}{I_B}\right)$$

Figure 5:
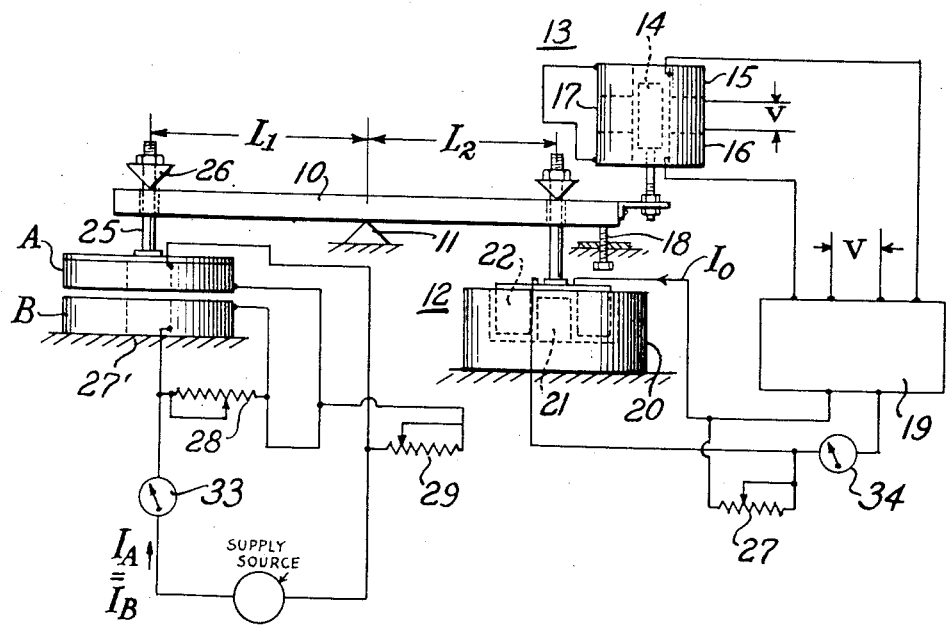

In Fig. 5 an arrangement is shown whereby the output current $I_O$ delivered to coil 22 may be made proportional to the square of the current delivered to coils A and B. Coils A and B are connected in series and the single input current is proportional to $K_3(I_A)^2$ or $K_3(I_B)^2$ therefore the currents $I_A$ or $I_B$ are proportional to $K_0\sqrt{I_O}$. The equation $I_A$ or $I_B = K_0\sqrt{I_O}$ may be derived as follows:

Beam 10 is in balance when the sum of the moments of the forces about fulcrum 11 is zero. Thus, $$F_{22} L_2 - F_{AB} L_1 = 0$$

$$F_{22} = \frac{L_1}{L_2} F_{AB} = K F_{AB}$$

where $$K = \frac{L_1}{L_2}$$

$$F_{22} = K_1 I_O \text{ and } F_{AB} = K_2 I_A \cdot I_B$$
$$\therefore K_1 I_O = K_2 I_A \cdot I_B$$

$$\therefore I_O = \frac{K_2}{K_1}(I_A \cdot I_B) = K_3(I_A I_B)$$

where $$K_3 = \frac{K_2}{K_1}$$

If $I_A = I_B$ then $I_O = K_3 (I_B)^2$ $$\therefore I_B = \sqrt{\frac{I_O}{K_3}} = K_0 \sqrt{I_O}$$

where $$K_0 = \sqrt{\frac{1}{K_3}}$$

If $I_B = I_A$ then $I_O = K_3(I_A)^2$ $$\therefore \sqrt{\frac{I_O}{K_3}} = K_0 \sqrt{I_O}$$

where $$K_0 = \sqrt{\frac{1}{K_3}}$$

If an ammeter 33 is placed in circuit with the coils A and B to measure the current input and an ammeter 34 is placed in circuit with coil 22 to measure the current output, it follows that the ammeter 33 will indicate values of current that are proportional to the square root of the output current Io in coil 22, and that ammeter 34 will indicate values of current that are proportional to the square of the current in coils A and B, or the square of the values of current indicated by ammeter 33.

From the foregoing description it will be apparent to those skilled in this art that various modifications and changes may be made in the illustrated embodiments of the invention without departing from either the spirit or the scope thereof. Therefore, what is claimed as new and desired to be secured by Letters Patent is:

1. An electro-magnetic input versus output relation device comprising a beam, a fulcrum therefor, a differential transformer having a core means for limiting movement of the beam and core between a position corresponding to zero output voltage of the transformer and one maximum output voltage position thereof, whereby, as the beam and core are actuated between said positions, the output voltage of the transformer will vary between zero and one maximum value, means for amplifying and rectifying said output voltage, an electro-magnetic balancing device comprising a permanent magnet core and a coil movable relative to the core, said coil being mechanically connected to said beam at one side of the fulcrum and electrically connected in circuit with said rectified output, a plurality of magnetically coupled coil windings for receiving variable current inputs, one of said coil windings being mechanically connected to said beam to oppose the force of the coil of said permanent magnet, the input coil winding mechanically connected to said beam being movable relative to the other input coil winding, the force exerted by said input coil windings being in proportion to the product of the input currents thereof, and the output current to the coil of said electro-magnetic device being proportional to said product and automatically balancing the force of said input coil windings on said beam.

2. A device according to claim 1 in which the input coil windings are connected in series whereby the force exerted thereby on the beam is proportional to the square of the current input thereto, and the current output to the coil of said electro-magnetic device is proportional to the square of said input current, the value of the input current being proportional to the square root of the output current.

3. A device according to claim 1 characterized by the fact that the output coil and one of the input coil windings are connected in series whereby when current flows in the other coil the value thereof at balance will be proportional to the quotient of the output current and the current in the other of said input coils.

4. A device according to claim 1 characterized by the fact that the fields of the input coils are air coupled.

References Cited in the file of this patent
UNITED STATES PATENTS

| Number | Name | Date |
| --- | --- | --- |
| 1,578,831 | Keeler | Mar. 30, 1926 |
| 2,098,654 | Carter | Nov. 9, 1937 |
| 2,310,955 | Hornfeck | Feb. 16, 1943 |
| 2,439,891 | Hornfeck | Apr. 20, 1948 |